US012563325B2

(12) United States Patent (10) Patent No.: US 12,563,325 B2
Han et al. (45) Date of Patent: Feb. 24, 2026

(54) TIME-DIVISION MULTI-CHANNEL TRANSMISSION AND RECEPTION SYSTEM

(71) Applicant: ELECTRONICS AND TELECOMMUNICATIONS RESEARCH INSTITUTE, Daejeon (KR)

(72) Inventors: Seon-Ho Han, Daejeon (KR); Bon Tae Koo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 24 days.

(21) Appl. No.: 18/439,939

(22) Filed: Feb. 13, 2024

(65) Prior Publication Data

US 2025/0080886 A1 Mar. 6, 2025

(30) Foreign Application Priority Data

Sep. 5, 2023 (KR) ........................ 10-2023-0117919

(51) Int. Cl.
*H04Q 11/04* (2006.01)
*H04B 7/0413* (2017.01)
*H04J 14/08* (2006.01)

(52) U.S. Cl.
CPC .......... *H04Q 11/0421* (2013.01); *H04J 14/08* (2013.01); *H04B 7/0413* (2013.01)

(58) Field of Classification Search
CPC .... H04Q 11/0421; H04J 14/08; H04B 7/0413
See application file for complete search history.

(56) References Cited

U.S. PATENT DOCUMENTS

| | | | | |
|---|---|---|---|---|
| 8,331,494 | B1 * | 12/2012 | Yu ...................... | H03H 17/0664 |
| | | | | 375/322 |
| 9,553,754 | B1 * | 1/2017 | Dorosenco .......... | H04L 27/3863 |
| 10,641,883 | B2 * | 5/2020 | Park ....................... | G01S 13/12 |
| 10,693,472 | B2 | 6/2020 | Kim et al. | |
| 11,204,667 | B1 * | 12/2021 | Jordan ................ | G06F 3/04182 |
| 2005/0141602 | A1 | 6/2005 | Hyun et al. | |

(Continued)

FOREIGN PATENT DOCUMENTS

| | | |
|---|---|---|
| KR | 10-2005-0066989 A | 6/2005 |
| KR | 10-2010-0021024 A | 2/2010 |

(Continued)

OTHER PUBLICATIONS

Alexander Leibetseder et al., "A 79 GHz 4 RX-2 TX SiGe-Integrated Sequential Sampling Pulse Radar", IEEE, 2022.

*Primary Examiner* — Janice N Tieu
(74) *Attorney, Agent, or Firm* — LRK PATENT LAW FIRM

(57) ABSTRACT

Disclosed is a time-division multi-channel transmission and reception system including a transmitter and a receiver. The transmitter includes a first transmit channel that outputs a first transmit signal based on a first time-division pulse signal, a second transmit channel that outputs a second transmit signal based on a second time-division pulse signal, and a time-division pulse generator that generates the first time-division pulse signal and the second time-division pulse signal based on a clock signal. The first transmit signal and the second transmit signal are separated from each other in time.

19 Claims, 4 Drawing Sheets

(56) References Cited

U.S. PATENT DOCUMENTS

2006/0181446 A1*   8/2006  Yu ........................... H03L 7/193
                                                341/143
2009/0232197 A1*   9/2009  Mimura ............... H04B 1/7174
                                                375/239
2014/0023164 A1    1/2014  Oh et al.
2016/0329935 A1   11/2016  Singerl et al.
2018/0267158 A1    9/2018  Kishigami
2021/0333386 A1   10/2021  Park et al.

FOREIGN PATENT DOCUMENTS

KR          10-1579898  B1    12/2015
KR          10-1762539  B1     7/2017
KR     10-2019-0128897  A     11/2019

* cited by examiner

FIG. 4

TIME-DIVISION MULTI-CHANNEL TRANSMISSION AND RECEPTION SYSTEM

CROSS-REFERENCE TO RELATED APPLICATION(S)

This application claims priority under 35 U.S.C. § 119 to Korean Patent Application No. 10-2023-0117919 filed on Sep. 5, 2023, in the Korean Intellectual Property Office, the disclosures of which are incorporated by reference herein in their entireties.

BACKGROUND

1. Field of the Invention

Embodiments of the present disclosure described herein relate to a time-division multi-channel transmission and reception system, and more particularly, relate to a multiple input multiple output (MIMO) system which operates in a pulse scheme.

2. Description of Related Art

In general, a multiple input multiple output (MIMO) system is a technology for transmitting signals as two or more antennas are installed in each of a transmitter and a receiver of a communication system, which refers to a system capable of increasing system capacity using limited frequency resources by transmitting a different signal in the same band for each antenna.

Meanwhile, to implement such a MIMO system in the communication system in an existing technology, a transceiver is configured in a method for constituting several antennas and several radio frequency (RF) lines. For example, the communication system may be configured using four or more antennas and four RF lines to constitute a 4×4 MIMO system.

PRIOR ART DOCUMENTS

Patent Documents

KR 1579898 B1

SUMMARY

Embodiments of the present disclosure provide a MIMO system for operating in a pulse scheme.

According to an embodiment, a time-division multi-channel transmission and reception system including a transmitter and a receiver may include the transmitter including a first transmit channel that outputs a first transmit signal based on a first time-division pulse signal, a second transmit channel that outputs a second transmit signal based on a second time-division pulse signal, and a time division pulse generator that generates the first time-division pulse signal and the second time-division pulse signal based on a clock signal. The first transmit signal and the second transmit signal may be separated from each other in time.

In an embodiment, the time-division pulse generator may include a pulse generator that generates a pulse at a certain period based on the clock signal and a switch that generates the first time-division pulse signal and the second time-division pulse signal based on the pulse.

In an embodiment, the pulse generator may include a delay locked loop.

In an embodiment, the pulse generator may control a pulse width and a pulse period of the pulse based on a pulse control signal.

In an embodiment, the pulse may include a first pulse and a second pulse being sequentially generated. The switch may output the first pulse to the first transmit channel to generate the first time-division pulse signal and may output the second pulse to the second transmit channel to generate the second time-division pulse signal.

In an embodiment, the time-division multi-channel transmission and reception system may further include a local signal generator that generates a local signal. The first transmit channel may include an up-mixer that performs frequency conversion of the first time-division pulse signal based on the local signal to output a transmit converted signal, a power amplifier that amplifies the transmit converted signal to output a transmit amplified signal, and a transmit antenna that radiates the first transmit signal to the outside based on the transmit amplified signal.

In an embodiment, the receiver may include a first receive channel that receives a first receive signal, a second receive channel that receives a second receive signal, and a signal processor that processes signals received from the first receive channel and the second receive channel.

In an embodiment, the first receive channel may include a receive antenna that receives the first receive signal, a low noise amplifier that amplifies the first receive signal and outputs a receive amplified signal, an IQ down-mixer that converts a frequency of the receive amplified signal based on the local signal to output a receive converted signal, an IQ low pass filter that passes a low bandwidth signal including a frequency of the received converted signal, and an IQ variable gain amplifier that amplifies the signal passing through the IQ low pass filter.

In an embodiment, the signal processor may include an analog-to-digital converter that converts the signals received from the first receive channel and the second receive channel into digital signals.

In an embodiment, the signal processor may calculate a position and an operation state of a target based on the digital signal.

According to an embodiment, an operation method of a time-division multi-channel transmission and reception system may include generating, by the time-division pulse generator, a first pulse based on a clock signal, outputting, by the time-division pulse generator, the first pulse to the first transmit channel to generate a first time-division pulse signal, generating, by the time-division pulse generator, a second pulse based on the clock signal, and outputting, by the time-division pulse generator, the second pulse to the second transmit channel to generate a second time-division pulse signal. The second pulse may be generated after a certain pulse repetition interval elapses after the first pulse is generated.

In an embodiment, the time-division pulse generator may include a pulse generator that generates the first pulse and the second pulse based on the clock signal and a switch that generates the first time-division pulse signal based on the first pulse and generates the second time-division pulse signal based on the second pulse.

In an embodiment, the time-division multi-channel transmission and reception system may further include a local signal generator that generates a local signal. The first transmit channel may include an up-mixer that performs frequency conversion of the first time-division pulse signal based on the local signal to output a transmit converted signal, a power amplifier that amplifies the transmit converted signal to output a transmit amplified signal, and a transmit antenna that radiates the first transmit signal to the outside based on the transmit amplified signal.

According to an embodiment, a time-division multi-channel transmission and reception system may include a first transmit channel that outputs a first transmit signal based on a first time-division pulse signal, a second transmit channel that outputs a second transmit signal based on a second time-division pulse signal, and a time-division pulse generator that generates the first time-division pulse signal and the second time-division pulse signal based on a clock signal. The first transmit signal and the second transmit signal may be separated from each other in time.

In an embodiment, the time-division pulse generator may include a pulse generator that generates a pulse at a certain period based on the clock signal and a switch that generates the first time-division pulse signal and the second time-division pulse signal based on the pulse.

In an embodiment, the pulse generator may include a delay locked loop.

In an embodiment, the pulse generator may control a pulse width and a pulse period of the pulse based on a pulse control signal.

In an embodiment, the pulse may include a first pulse and a second pulse being sequentially generated. The switch may output the first pulse to the first transmit channel to generate the first time-division pulse signal and may output the second pulse to the second transmit channel to generate the second time-division pulse signal.

In an embodiment, the time-division multi-channel transmission and reception system may further include a local signal generator that generates a local signal. The first transmit channel may include an up-mixer that performs frequency conversion of the first time-division pulse signal based on the local signal to output a transmit converted signal, a power amplifier that amplifies the transmit converted signal to output a transmit amplified signal, and a transmit antenna that radiates the first transmit signal to the outside based on the transmit amplified signal.

BRIEF DESCRIPTION OF THE DRAWINGS

The above and other objects and features of the present disclosure will become apparent by describing in detail embodiments thereof with reference to the accompanying drawings.

FIG. 4 is a drawing illustrating an example of first to fourth time-division pulses generated by a time-division pulse generator of FIG. 1.

DETAILED DESCRIPTION

An embodiment of the present disclosure will be described with reference to the accompanying drawings so as to sufficiently understand constitutions and effects of the present disclosure.

The present disclosure is not limited to the embodiment which will be described below, but may be implemented in several forms and may make various modifications and changes. However, the present disclosure is provided so that this disclosure will be thorough and complete, and will fully convey the scope of the present disclosure to those skilled in the art through the description of the embodiment. The components in the accompanying drawings are shown enlarged for convenience of description, and the proportions of the components may be exaggerated or reduced.

Embodiments described in the specification will be described with reference to cross-sectional views and/or plan views, which are idealized views of the present disclosure. The terms "first", "second", and "third" are used to described various components in various embodiments of the specification, but these components are not limited by such terms. These terms are only used to distinguish one component from another component. Embodiments described and exemplified herein include complementary embodiments thereof.

Figure 1:
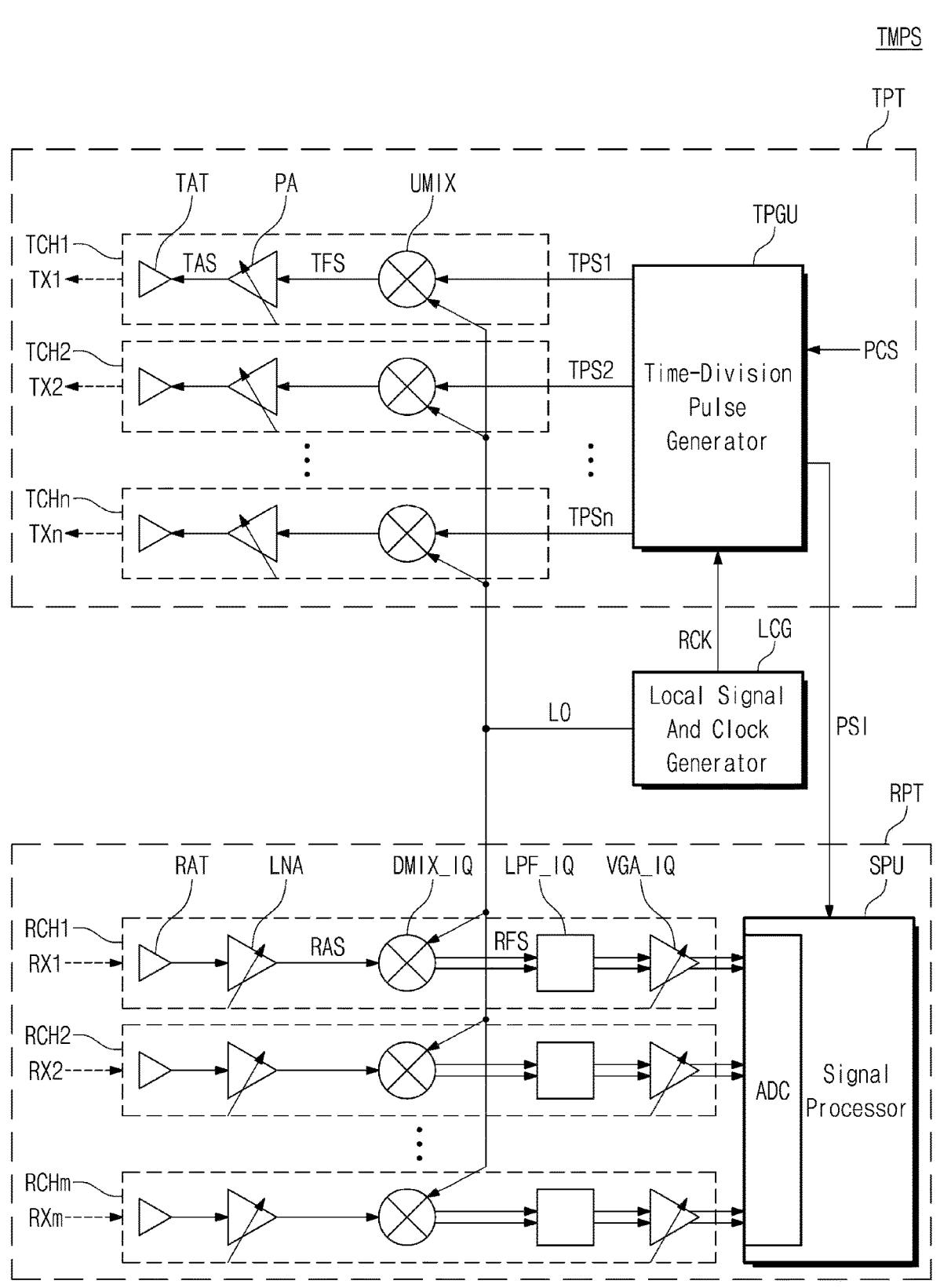
FIG. 1 is a drawing illustrating an embodiment of a time-division multi-channel transmission and reception system according to the present disclosure.

FIG. 1 is a drawing illustrating an embodiment of a time-division multi-channel transmission and reception system according to the present disclosure.

Referring to FIG. 1, a time-division multi-channel transmission and reception system TMPS may include a transmitter TPT, a receiver RPT, and a local signal and clock generator LCG. In an embodiment, the time-division multi-channel transmission and reception system TMPS may be an n×m multiple input multiple output (MIMO) system including n transmit channels and m receive channels.

The local signal and clock generator LCG may be configured to generate a local signal LO and output the local signal LO to mixers of the transmitter TPT and the receiver RPT, which will be described below. The local signal LO may have a frequency of 10 GHz to 10 THz.

The local signal and clock generator LCG may be configured to generate a clock signal RCK and output the clock signal RCK to a time-division pulse generator TPGU of the transmitter TPT, which will be described below.

The transmitter TPT may include a plurality of transmit channels and the time-division pulse generator TPGU.

The plurality of transmit channels may include first to nth transmit channels TCH1 to TCHn. The first transmit channel TCH1 may be configured to output a first transmit signal TX1 based on a first time-division pulse signal TPS1. The second transmit channel TCH2 may be configured to output a second transmit signal TX2 based on a second time-division pulse signal TPS2. The nth transmit channel TCHn may be configured to output an nth transmit signal TXn based on an nth time-division pulse signal TPSn.

Each transmit channel may include an up-mixer UMIX, a power amplifier PA, and a transmit antenna TAT. The up-mixer UMIX, the power amplifier PA, and the transmit antenna TAT may be connected with each other in series in one transmit channel. Hereinafter, the first transmit channel TCH1 will be representatively described.

The up-mixer UMIX may be configured to receive the local signal LO and a time-division pulse signal TPS1. The up-mixer UMIX may perform frequency conversion of the time-division pulse signal TPS1 received based on the local signal LO to output a transmit converted signal TFS. In an embodiment, the up-mixer UMIX may beat a frequency of the time-division pulse signal TPS1 by a frequency of the local signal LO.

In an embodiment, the frequency of the transmit converted signal TFS may be the same as the sum of the frequency of the time-division pulse signal TPS1 and the frequency of the local signal LO. For example, when the frequency of the time-division pulse signal TPS1 is 10 GHz and when the frequency of the local signal LO is 100 GHz, the transmit converted signal TFS output from the up-mixer UMIX may have a frequency of 110 GHz. For example, the transmit converted signal TFS may include a millimeter or terahertz wave signal.

The power amplifier PA may be configured to amplify the received transmit converted signal TFS to output a transmit amplified signal TAS.

The transmit antenna TAT may be configured to radiate the transmit signal TX1 based on the received transmit amplified signal TAS. For example, the transmit antenna TAT may include a horn-type antenna.

The time-division pulse generator TPGU may be configured to generate a pulse at a certain period based on the clock signal RCK. For example, the time-division pulse generator TPGU may be configured to repeatedly generate a pulse depending on a certain pulse repetition Interval (PRI).

The time-division pulse generator TPGU may be configured to control a pulse width, the pulse period PRI, pulse removal, or the like of a pulse generated based on a pulse control signal PCS.

The time-division pulse generator TPGU may be configured to generate a plurality of time-division pulse signals corresponding to the plurality of transmit channels based on the pulse. The plurality of time-division pulse signals may include first to nth time-division pulse signals TPS1 to TPSn which are separated from each other in time.

For example, the second time-division pulse signal TPS2 may be separated from the first time-division pulse signal TPS1 by a certain period. In other words, the second time-division pulse signal TPS2 may be a pulse generated after the certain period elapses after the first time-division pulse signal TPS1 is generated. Likewise, the nth time-division pulse signal TPSn may be separated from the n−1st time-division pulse signal by the certain period. The time-division pulse generator TPGU may repeatedly generate the first to nth time-division pulse signals TPS1 to TPSn.

The time-division pulse generator TPGU may be configured to sequentially output the plurality of time-division pulse signals to the plurality of transmit channels.

For example, the time-division pulse generator TPGU may be configured to output the first time-division pulse signal TPS1 to the first transmit channel TCH1, output the second time-division pulse signal TPS2 to the second transmit channel TCH2, and output the nth time-division pulse signal TPSn to the nth transmit channel TCHn.

As the plurality of time-division pulse signals are separated from each other in time, a plurality of transmit signals output from the plurality of transmit channels may be separated from each other in time. In other words, the plurality of transmit signals may include pulses which are separated from each other.

For example, the second transmit signal may be separated from the first transmit signal by the certain period, the third transmit signal may be separated from the second transmit signal by the certain period, and the nth transmit signal may be separated from the n−1st transmit signal by the certain period.

The time-division pulse generator TPGU may be configured to output pulse start information PSI for providing a notification that a time-division pulse starts. The pulse start information PSI may include information about a start time point when the pulse generated by the time-division pulse generator TPGU is generated.

Hereinafter, a description will be given of a detailed configuration and operation of the time-division pulse generator TPGU with reference to FIG. 2.

The receiver RPT may include a plurality receive channels and a signal processor SPU.

The plurality of receive channels may include first to mth receive channels RCH1 to RCHm. The first receive channel RCH1 may be configured to receive a first receive signal RX1. The second receive channel RCH2 may be configured to receive a second receive signal RX2. The mth receive channel RCHm may be configured to receive an mth receive signal RXm. Each receive signal may refer to a signal received after the transmit signal output from the transmitter TPT transmits a target or is reflected from the target.

Each receive channel may include a receive antenna RAT, a low noise amplifier LNA, an IQ down-mixer DMIX_IQ, an IQ low pass filter LPF_IQ, and an IQ variable gain amplifier VGA_IQ. The receive antenna RAT, the low noise amplifier LNA, the IQ down-mixer DMIX_IQ, the IQ low pass filter LPF_IQ, and the IQ variable gain amplifier VGA_IQ may be connected with each other in series in one receive channel. Hereinafter, the first receive channel RCH1 will be representatively described.

The receive antenna RAT may be configured to receive the receive signal RX1. For example, the receive signal RX1 received by the receive antenna RAT may include a millimeter or terahertz wave signal.

The low noise amplifier LNA may be configured to amplify the receive signal RX1 received from the receive antenna RAT and output a receive amplified signal RAS.

The IQ down-mixer DMIX_IQ may be configured to receive the local signal LO and the receive amplified signal RAS. The IQ down-mixer DMIX_IQ may be configured to convert a frequency of the receive amplified signal RAS based on the local signal LO and output the receive converted signal RFS.

In an embodiment, the IQ down-mixer DMIX_IQ may be a quadrature-phase frequency down-converter. The received converted signal RFS may include an in-phase signal and a quadrature-phase signal, a phase of which is shifted at 90 degrees from the in-phase signal. For example, the IQ down-mixer DMIX_IQ may include a frequency multiplier for converting a frequency of the local signal LO and a quadrature-phase signal generator for converting a phase of the receive amplified signal RAS.

In an embodiment, the frequency of the receive converted signal RFS output from the IQ down-mixer DMIX_IQ may be the same as a difference between the frequency of the receive signal RX1 and the frequency of the local signal LO. For example, when the frequency of the receive signal RX1 is 110 GHz and when the frequency of the local signal LO is 100 GHz, the receive converted signal RFS output from the IQ down-mixer DMIX_IQ may have a frequency of 10 GHz.

The IQ low pass filter LPF_IQ may be configured to pass a specific low bandwidth signal including the frequency of the received converted signal RFS and filter the other signals. For example, the IQ low pass filter LPF_IQ may be a quadrature-phase IQ low pass filter LPF_IQ.

The IQ variable gain amplifier VGA_IQ may be configured to amplify the signal passing through the IQ low pass filter LPF_IQ and output the amplified signal to the signal processor SPU. For example, the IQ variable gain amplifier VGA_IQ may be a quadrature-phase variable gain amplifier.

The signal processor SPU may be configured to receive signals from the plurality of receive channels and receive the pulse start information PSI from the time-division pulse generator TPGU. The signal processor SPU may be configured to measure a time when transmit signals output from the transmit channels of the transmitter TPT travel back and forth to a target and reach the receive channels of the receiver RPT based on the pulse start information PSI and the signals received from the plurality of receive channels and calculate a distance between the target and the channels.

In an embodiment, the signal processor SPU may include an analog-to-digital converter ADC configured to convert the signals received from the plurality of channels into digital signals.

The signal processor SPU may be configured to calculate a position and an operation state of the target, based on the digital signal converted by the analog-to-digital converter ADC. For example, the signal processor SPU may be configured to calculate a distance from the system to the target, a movement speed of the target, and/or an angle of the receive signal received from the target based on the digital signal.

An embodiment according to the present disclosure may transmit time-division pulse signals through the plurality of transmit channels. Thus, the present disclosure may simply implement MIMO performance using the pulse scheme.

Figure 2:
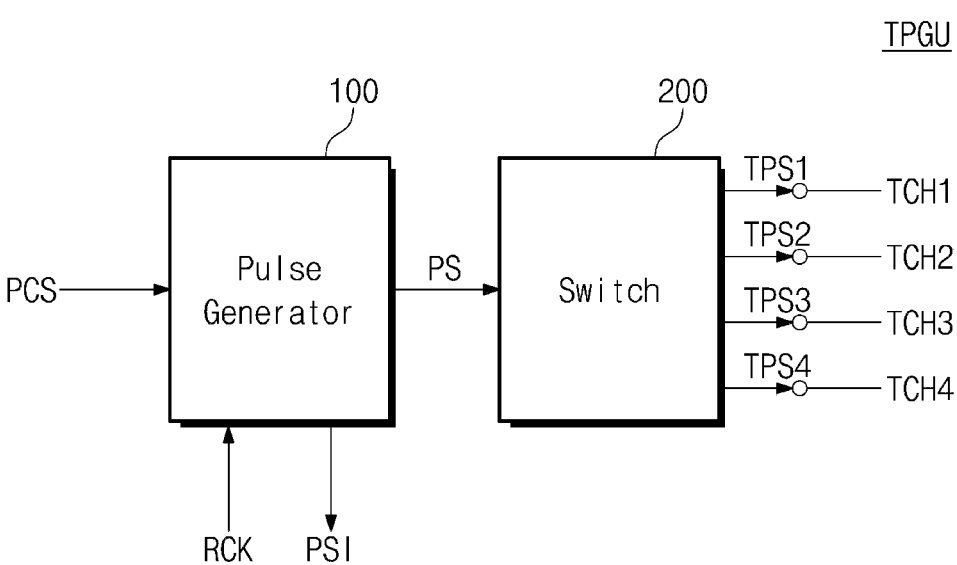
FIG. 2 is a block diagram illustrating a time-division pulse generator of FIG. 1.

FIG. 2 is a block diagram illustrating a time-division pulse generator of FIG. 1.

Referring to FIG. 2, a time-division pulse generator TPGU may include a pulse generator 100 and a switch 200.

The pulse generator 100 may be configured to receive a clock signal RCK. The pulse generator 100 may be configured to generate a pulse PS at a certain period based on the clock signal RCK. For example, the pulse generator 100 may be configured to repeatedly generate the pulse PS depending on a certain pulse repetition Interval PRI. The pulse generator 100 may be configured to control a pulse width, the pulse period PRI, pulse removal, or the like of the pulse PS based on a pulse control signal PCS.

The pulse generator 100 may include a feedback loop circuit configured to generate the pulse PS insensitive to a process, voltage, temperature (PVT). For example, the feedback loop circuit may be a delay locked loop.

The pulse generator 100 may be configured to output pulse start information PSI for notifying the signal processor SPU of the receiver RPT that the pulse PS starts.

The switch 200 may be configured to generate a plurality of time-division pulse signals corresponding to the plurality of transmit channels based on the pulse PS. The switch 200 may be configured to sequentially output the pulse PS to the plurality of transmit channels and generate a plurality of time-division pulse signals.

For example, assuming that the transmit channels are 4, the switch 200 may output a first pulse to the first transmit channel to generate a first time-division pulse signal, may output a second pulse to the second transmit channel to generate a second time-division pulse signal, may output a third pulse to the third transmit channel to generate a third time-division pulse signal, and may output a fourth pulse to the fourth transmit channel to generate a fourth time-division pulse signal.

Figure 3:
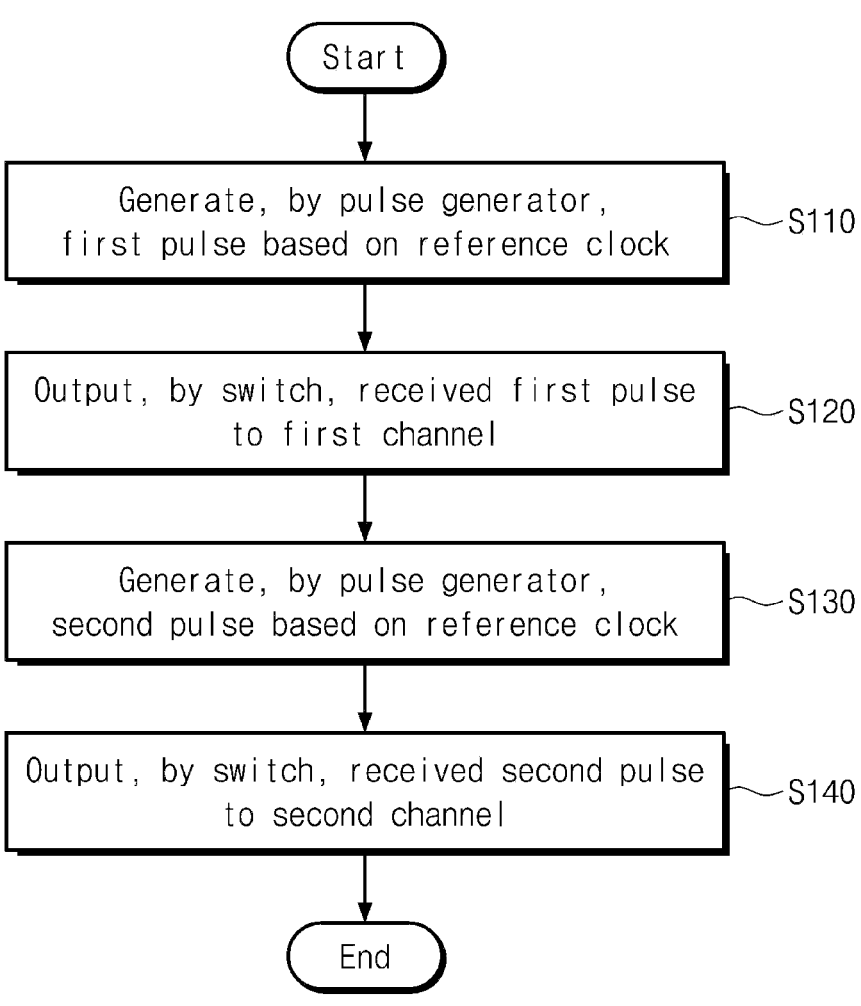
FIG. 3 is a drawing for describing an operation of a time-division pulse generator of FIG. 2.

FIG. 3 is a drawing for describing an operation of a time-division pulse generator of FIG. 2. Hereinafter, a description will be given of an operation method of a time-division pulse generator with reference to FIG. 2 together.

Referring to FIGS. 2 and 3, in operation S110, a pulse generator 100 may generate a first pulse based on a clock signal RCK.

In operation S120, a switch 200 may output the first pulse to a first transmit channel TCH1 to generate a first time-division pulse signal TPS1.

In operation S130, the pulse generator 100 may generate a second pulse based on the clock signal RCK. The second pulse may be generated after a certain pulse repetition interval elapses after the first pulse is generated.

In operation S140, the switch 200 may output the second pulse to a second transmit channel TCH2 to generate a second time-division pulse signal TPS2.

Figure 4:
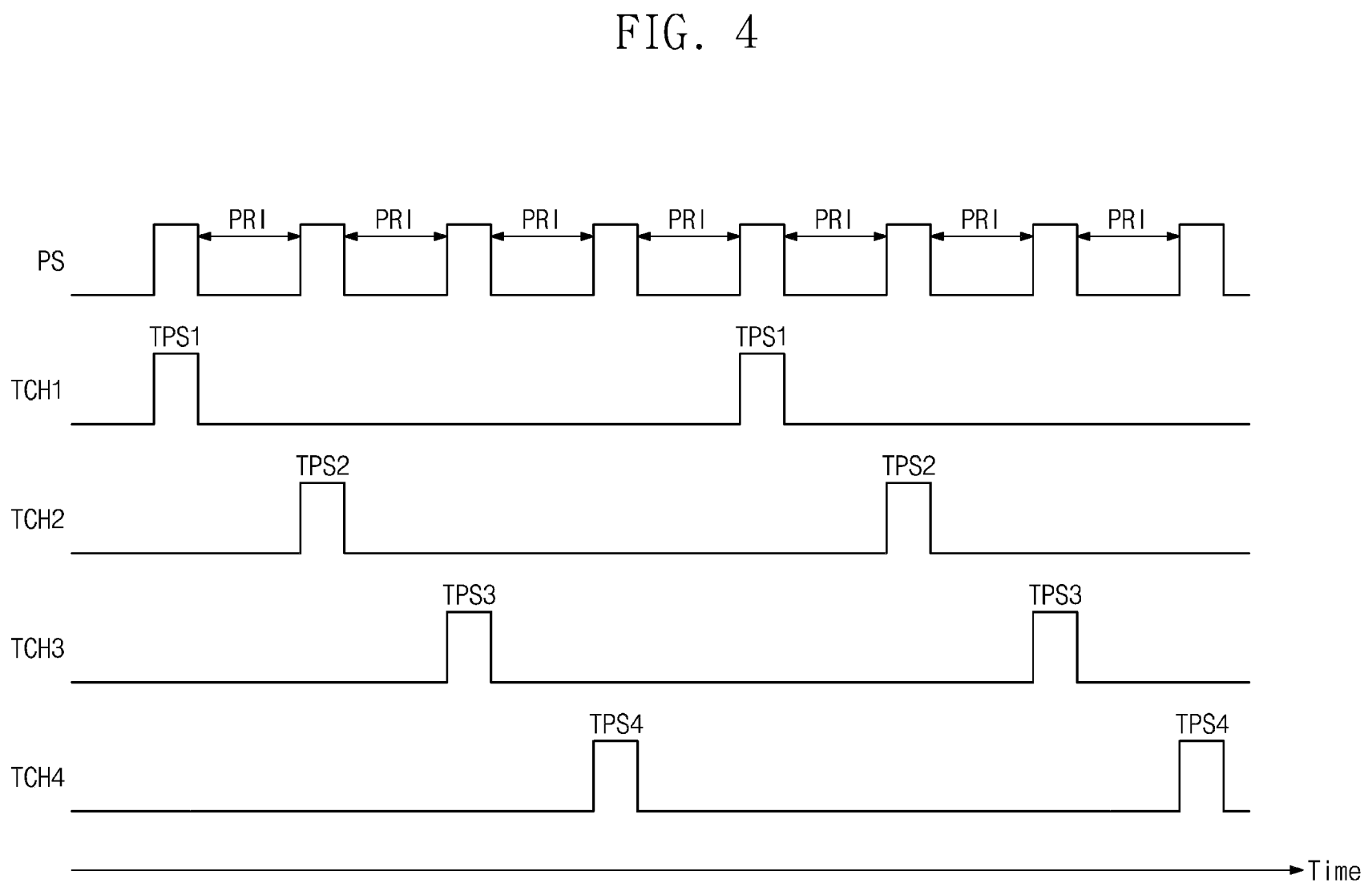

FIG. 4 is a drawing illustrating an example of first to fourth time-division pulses generated by a time-division pulse generator of FIG. 1.

Referring to FIG. 4, a pulse may be repeatedly generated according to a certain pulse repetition period by a time-division pulse generator TPGU. The time-division pulse generator TPGU may be configured to generate a plurality of time-division pulse signals corresponding to a plurality of transmit channels based on the pulse.

Assuming that the transmit channels are 4, first to fourth time-division pulse signals TPS1 to TPS4 which are separated from each other in time may be output to the four transmit channels.

The first time-division pulse signal TPS1 output to the first transmit channel TCH1 may be generated as one pulse is delivered to the first transmit channel TCH1 whenever four pulses (the total number of transmit channels) are generated. The first time-division pulse signal TPS1 may include a first generated pulse.

The second time-division pulse signal TPS2 output to the second transmit channel TCH2 may include a pulse generated after a pulse repetition period elapses after the pulse of the first time-division pulse signal TPS1 is generated.

The third time-division pulse signal TPS3 output to the third transmit channel TCH3 may include a pulse generated after the pulse repetition period elapses after the pulse of the second time-division pulse signal TPS2 is generated.

The fourth time-division pulse signal TPS4 output to the fourth transmit channel TCH4 may include a pulse generated after the pulse repetition period elapses after the pulse of the third time-division pulse signal TPS3 is generated.

An embodiment according to the present disclosure may provide a MIMO system which operates in a pulse scheme.

The above-mentioned contents are detailed embodiments for executing the present disclosure. The present disclosure may include embodiments which are simply changed in design or are easily changed, as well as the embodiments described above. Furthermore, the present disclosure may include technologies capable of being easily modified and executed using embodiments. Thus, the scope of the present disclosure is not limited and determined to the embodiments described above and should be determined by the following claims and equivalents with the claims of the present disclosure.

What is claimed is:

1. A time-division multi-channel transmission and reception system including a transmitter and a receiver, the time-division multi-channel transmission and reception system comprising:

the transmitter including:

a first transmit channel configured to output a first transmit signal based on a first time-division pulse signal;

a second transmit channel configured to output a second transmit signal based on a second time-division pulse signal; and a time-division pulse generator configured to generate, from a single clock signal, a sequence of pulses that are sequentially distributed to different transmit channels, wherein the first time-division pulse signal and the second time-division pulse signal are respectively provided to the first transmit channel and the second transmit channel, wherein the first transmit signal and the second transmit signal are separated from each other in time.

2. The time-division multi-channel transmission and reception system of claim 1, wherein the time-division pulse generator includes:

a pulse generator configured to generate a pulse at a certain period based on the clock signal; and a switch configured to generate the first time-division pulse signal and the second time-division pulse signal based on the pulse.

3. The time-division multi-channel transmission and reception system of claim 2, wherein the pulse generator includes a delay locked loop.

4. The time-division multi-channel transmission and reception system of claim 2, wherein the pulse generator is configured to control a pulse width and a pulse period of the pulse based on a pulse control signal.

5. The time-division multi-channel transmission and reception system of claim 2, wherein the pulse includes a first pulse and a second pulse being sequentially generated, and wherein the switch is configured to output the first pulse to the first transmit channel to generate the first time-division pulse signal and output the second pulse to the second transmit channel to generate the second time-division pulse signal.

6. The time-division multi-channel transmission and reception system of claim 1, further comprising:

a local signal generator configured to generate a local signal, wherein the first transmit channel includes:

an up-mixer configured to perform frequency conversion of the first time-division pulse signal based on the local signal to output a transmit converted signal;

a power amplifier configured to amplify the transmit converted signal to output a transmit amplified signal; and a transmit antenna configured to radiate the first transmit signal to the outside based on the transmit amplified signal.

7. The time-division multi-channel transmission and reception system of claim 6, wherein the receiver includes:

a first receive channel configured to receive a first receive signal;

a second receive channel configured to receive a second receive signal; and a signal processor configured to process signals received from the first receive channel and the second receive channel.

8. The time-division multi-channel transmission and reception system of claim 7, wherein the first receive channel includes:

a receive antenna configured to receive the first receive signal;

a low noise amplifier configured to amplify the first receive signal and output a receive amplified signal;

an IQ down-mixer configured to convert a frequency of the receive amplified signal based on the local signal to output a receive converted signal;

an IQ low pass filter configured to pass a low bandwidth signal including a frequency of the received converted signal; and an IQ variable gain amplifier configured to amplify the signal passing through the IQ low pass filter.

9. The time-division multi-channel transmission and reception system of claim 8, wherein the signal processor includes an analog-to-digital converter configured to convert the signals received from the first receive channel and the second receive channel into digital signals.

10. The time-division multi-channel transmission and reception system of claim 8, wherein the IQ down-mixer includes a frequency multiplier for converting a frequency of the local signal and a quadrature-phase signal generator for converting a phase of the receive amplified signal.

11. An operation method of a time-division multi-channel transmission and reception system including a first transmit channel, a second transmit channel, and a time-division pulse generator, the operation method comprising:

generating, by the time-division pulse generator, from a clock signal generated and output by a clock generator, a sequence of pulses that are sequentially distributed to different transmit channels;

outputting, by the time-division pulse generator, a first pulse to the first transmit channel to generate a first time-division pulse signal;

and outputting, by the time-division pulse generator, a second pulse to the second transmit channel to generate a second time-division pulse signal, wherein the second pulse is generated after a certain pulse repetition interval elapses after the first pulse is generated.

12. The operation method of claim 11, wherein the time-division pulse generator includes:

a pulse generator configured to generate the first pulse and the second pulse based on the clock signal; and a switch configured to generate the first time-division pulse signal based on the first pulse and generate the second time-division pulse signal based on the second pulse.

13. The operation method of claim 11, wherein the time-division multi-channel transmission and reception system further includes a local signal generator configured to generate a local signal, and wherein the first transmit channel includes:

an up-mixer configured to perform frequency conversion of the first time-division pulse signal based on the local signal to output a transmit converted signal;

a power amplifier configured to amplify the transmit converted signal to output a transmit amplified signal; and a transmit antenna configured to radiate the first transmit signal to the outside based on the transmit amplified signal.

14. A time-division multi-channel transmission and reception system, comprising:

a first transmit channel configured to output a first transmit signal based on a first time-division pulse signal;

a second transmit channel configured to output a second transmit signal based on a second time-division pulse signal; and a time-division pulse generator configured to generate, from a single clock signal, a sequence of pulses that are sequentially distributed to different transmit channels, wherein the first time-division pulse signal and the second time-division pulse signal are respectively provided to the first transmit channel and the second transmit channel, wherein the first transmit signal and the second transmit signal are separated from each other in time.

15. The time-division multi-channel transmission and reception system of claim 14, wherein the time-division pulse generator includes:

a pulse generator configured to generate a pulse at a certain period based on the clock signal; and a switch configured to generate the first time-division pulse signal and the second time-division pulse signal based on the pulse.

16. The time-division multi-channel transmission and reception system of claim 15, wherein the pulse generator includes a delay locked loop.

17. The time-division multi-channel transmission and reception system of claim 15, wherein the pulse generator is configured to control a pulse width and a pulse period of the pulse based on a pulse control signal.

18. The time-division multi-channel transmission and reception system of claim 15, wherein the pulse includes a first pulse and a second pulse being sequentially generated, and wherein the switch is configured to output the first pulse to the first transmit channel to generate the first time-division pulse signal and output the second pulse to the second transmit channel to generate the second time-division pulse signal.

19. The time-division multi-channel transmission and reception system of claim 14, further comprising:

a local signal generator configured to generate a local signal, wherein the first transmit channel includes:

an up-mixer configured to perform frequency conversion of the first time-division pulse signal based on the local signal to output a transmit converted signal;

a power amplifier configured to amplify the transmit converted signal to output a transmit amplified signal; and a transmit antenna configured to radiate the first transmit signal to the outside based on the transmit amplified signal.

* * * * *